United States Patent
Kleehammer et al.

(10) Patent No.: US 10,346,779 B2
(45) Date of Patent: Jul. 9, 2019

(54) SYSTEMS AND METHODS FOR INCIDENT QUEUE ASSIGNMENT AND PRIORITIZATION

(71) Applicant: Fiserv, Inc., Brookfield, WI (US)

(72) Inventors: Michael Lee Kleehammer, Grapevine, TX (US); Michael Fisher Loyd, McKinney, TX (US); David Keith Johnson, Suwanee, GA (US)

(73) Assignee: Fiserv, Inc., Brookfield, WI (US)

( * ) Notice: Subject to any disclaimer, the term of this patent is extended or adjusted under 35 U.S.C. 154(b) by 0 days.

(21) Appl. No.: 14/639,946

(22) Filed: Mar. 5, 2015

(65) Prior Publication Data

US 2015/0178657 A1    Jun. 25, 2015

Related U.S. Application Data

(63) Continuation of application No. 13/840,476, filed on Mar. 15, 2013, now abandoned.

(51) Int. Cl.
*G06Q 10/00* (2012.01)
*G06Q 10/06* (2012.01)

(52) U.S. Cl.
CPC . *G06Q 10/06316* (2013.01); *G06Q 10/06311* (2013.01); *G06Q 10/063114* (2013.01)

(58) Field of Classification Search
CPC ....... G06Q 10/06316; G06Q 10/06311; G06Q 10/063114
See application file for complete search history.

(56) References Cited

U.S. PATENT DOCUMENTS

| | | | | |
|---|---|---|---|---|
| 5,984,178 A | * | 11/1999 | Gill | G06Q 20/1085 235/376 |
| 6,249,571 B1 | * | 6/2001 | Rojas | H04M 15/00 379/112.01 |
| 6,279,826 B1 | * | 8/2001 | Gill | G06Q 20/18 235/379 |
| 6,556,659 B1 | * | 4/2003 | Bowman-Amuah | H04L 12/14 370/252 |
| 6,574,605 B1 | * | 6/2003 | Sanders | G06Q 10/063112 705/7.26 |
| 6,845,148 B1 | * | 1/2005 | Beamon | H04M 3/2254 379/15.03 |
| 7,159,237 B2 | * | 1/2007 | Schneier | G06F 21/552 709/223 |
| 7,357,301 B1 | * | 4/2008 | Bajpay | G06Q 10/10 235/376 |
| 8,086,907 B1 | * | 12/2011 | Narin | H04L 41/0604 709/224 |

(Continued)

*Primary Examiner* — Jonathan G Sterrett
(74) *Attorney, Agent, or Firm* — Alston & Bird LLP

(57) ABSTRACT

Systems, methods and computer-readable media for incident queue assignment and prioritization are disclosed. An incident handling system may receive a request for a next highest priority incident. An incident requiring resolution may be identified. The incident may be associated with an incident queue based at least in part on a queue assignment rule. The incident queue may comprise one or more incidents. The incident queue may be processed based at least in part on a prioritization rule to identify, from the one or more incidents associated with the incident queue, the next highest priority incident. The incident handling system may transmit the next highest priority incident associated with the incident queue.

9 Claims, 10 Drawing Sheets

(56) References Cited

U.S. PATENT DOCUMENTS

| | | | | |
|---|---|---|---|---|
| 8,458,323 | B1* | 6/2013 | Baader, II | H04L 41/5074 709/223 |
| 9,436,532 | B1* | 9/2016 | Chandrasekaran | G06Q 10/06 |
| 2002/0161875 | A1* | 10/2002 | Raymond | H04L 41/0631 709/223 |
| 2003/0110228 | A1* | 6/2003 | Xu | G06Q 10/10 709/207 |
| 2003/0221123 | A1* | 11/2003 | Beavers | G06F 21/55 726/23 |
| 2004/0120250 | A1* | 6/2004 | Langevin | H04L 41/0681 370/216 |
| 2005/0131937 | A1* | 6/2005 | Parkyn | H04L 41/0654 |
| 2005/0131943 | A1* | 6/2005 | Lewis | G06Q 30/02 |
| 2006/0059107 | A1* | 3/2006 | Elmore | G06Q 10/06 705/64 |
| 2007/0294406 | A1* | 12/2007 | Suer | G06Q 10/06 709/226 |
| 2008/0155564 | A1* | 6/2008 | Shcherbina | G06Q 10/06 719/318 |
| 2008/0270198 | A1* | 10/2008 | Graves | G06Q 10/06 705/7.12 |
| 2008/0295100 | A1* | 11/2008 | Ainsworth | G06Q 10/06 718/102 |
| 2009/0052329 | A1* | 2/2009 | Mahajan | G06F 17/2247 370/242 |
| 2009/0055720 | A1* | 2/2009 | Ngo | G06Q 10/10 715/205 |
| 2011/0246378 | A1* | 10/2011 | Prussack | G06F 17/2785 705/310 |
| 2011/0295898 | A1* | 12/2011 | Grabarnik | G06Q 10/103 707/780 |
| 2012/0042318 | A1* | 2/2012 | Doan | G06Q 10/06315 718/103 |
| 2012/0060163 | A1* | 3/2012 | Khan | H04L 63/105 718/103 |
| 2012/0069978 | A1* | 3/2012 | Evans, Jr. | H04M 3/5175 379/112.06 |
| 2012/0185290 | A1* | 7/2012 | Mueller | G06Q 10/063114 705/7.15 |
| 2012/0323623 | A1* | 12/2012 | Sabharwal | G06Q 10/063112 705/7.14 |
| 2013/0176858 | A1* | 7/2013 | Zee | H04L 43/08 370/241 |
| 2013/0179736 | A1* | 7/2013 | Gschwind | G06F 11/3075 714/37 |
| 2014/0032254 | A1* | 1/2014 | Della Corte | G06Q 30/016 705/7.14 |
| 2014/0039958 | A1* | 2/2014 | Bivens | G06Q 10/06 705/7.15 |
| 2014/0059395 | A1* | 2/2014 | Mahindru | G06F 11/07 714/48 |

* cited by examiner

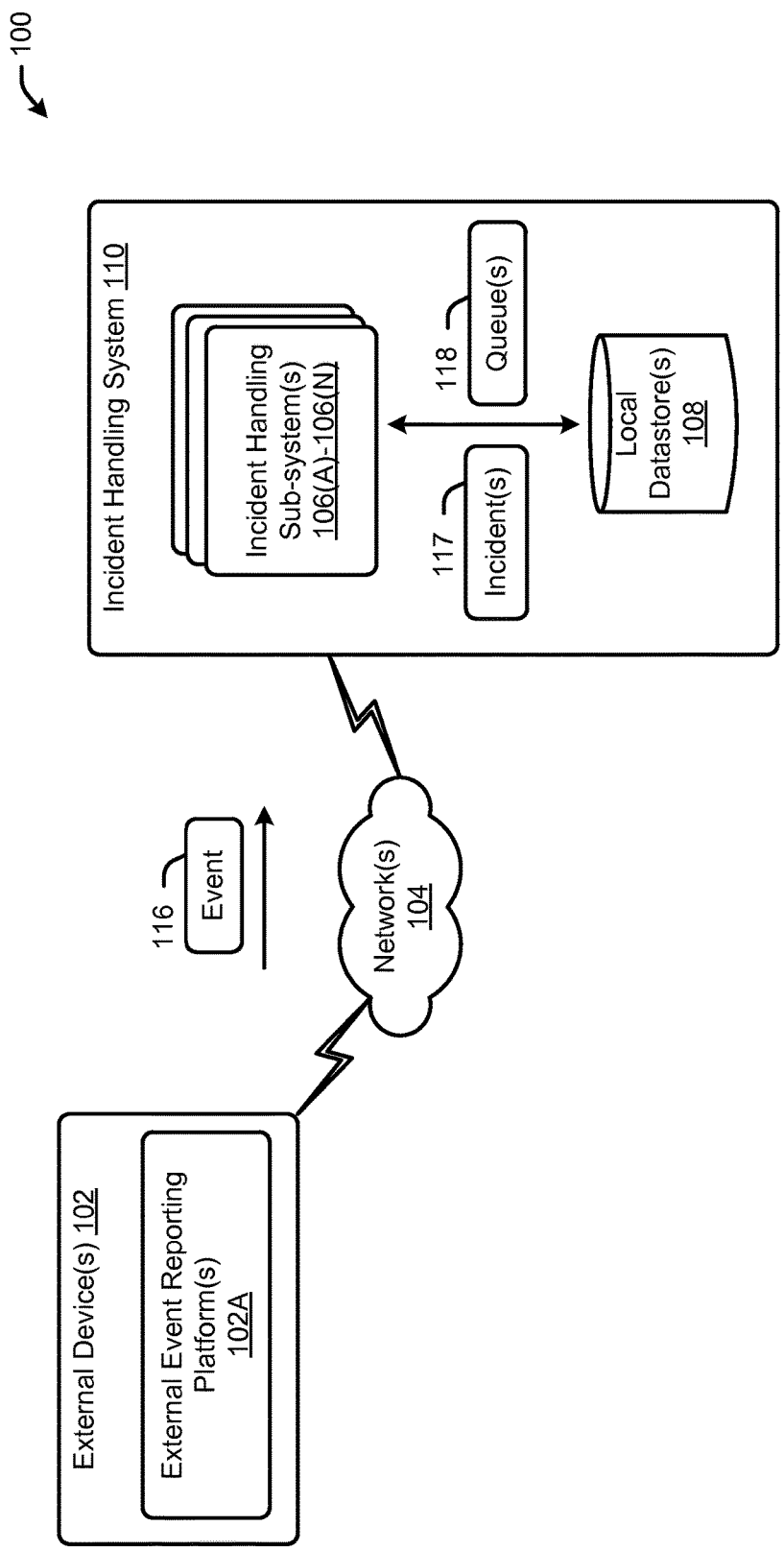

SYSTEMS AND METHODS FOR INCIDENT QUEUE ASSIGNMENT AND PRIORITIZATION

CROSS-REFERENCE TO RELATED APPLICATIONS

This application is a continuation of U.S. application Ser. No. 13/840,476, filed Mar. 15, 2013, the content of which is incorporated by reference herein in its entirety.

BACKGROUND

Many institutions may have a computing ecosystem consisting of a variety of different types of devices and platforms. One example of such a device or platform may be an automated teller machine (ATM). An ATM may be out of cash, its screen may be broken, or its software may have malfunctioned. However, due to the large number of ATMs located in different geographic areas, it may be difficult to identify all the issues associated with the ATMs, much less resolve the issues quickly.

BRIEF DESCRIPTION OF THE DRAWINGS

The detailed description is set forth with reference to the accompanying drawings. Use of the same reference numerals indicates similar or identical components or elements; however, similar components or elements may also be designated with different reference numerals. Various embodiments of the disclosure may utilize elements or components other than those illustrated in the accompanying drawings and some elements and/or components may not be present in one or more embodiments. It should be appreciated that while singular terminology may be used to describe various components or elements, a plural number of such components or elements is also within the scope of the disclosure.

FIG. 1A schematically depicts an illustrative networked architecture for incident queue assignment and prioritization in accordance with one or more embodiments of the disclosure.

DETAILED DESCRIPTION

Overview

Figure 1B:
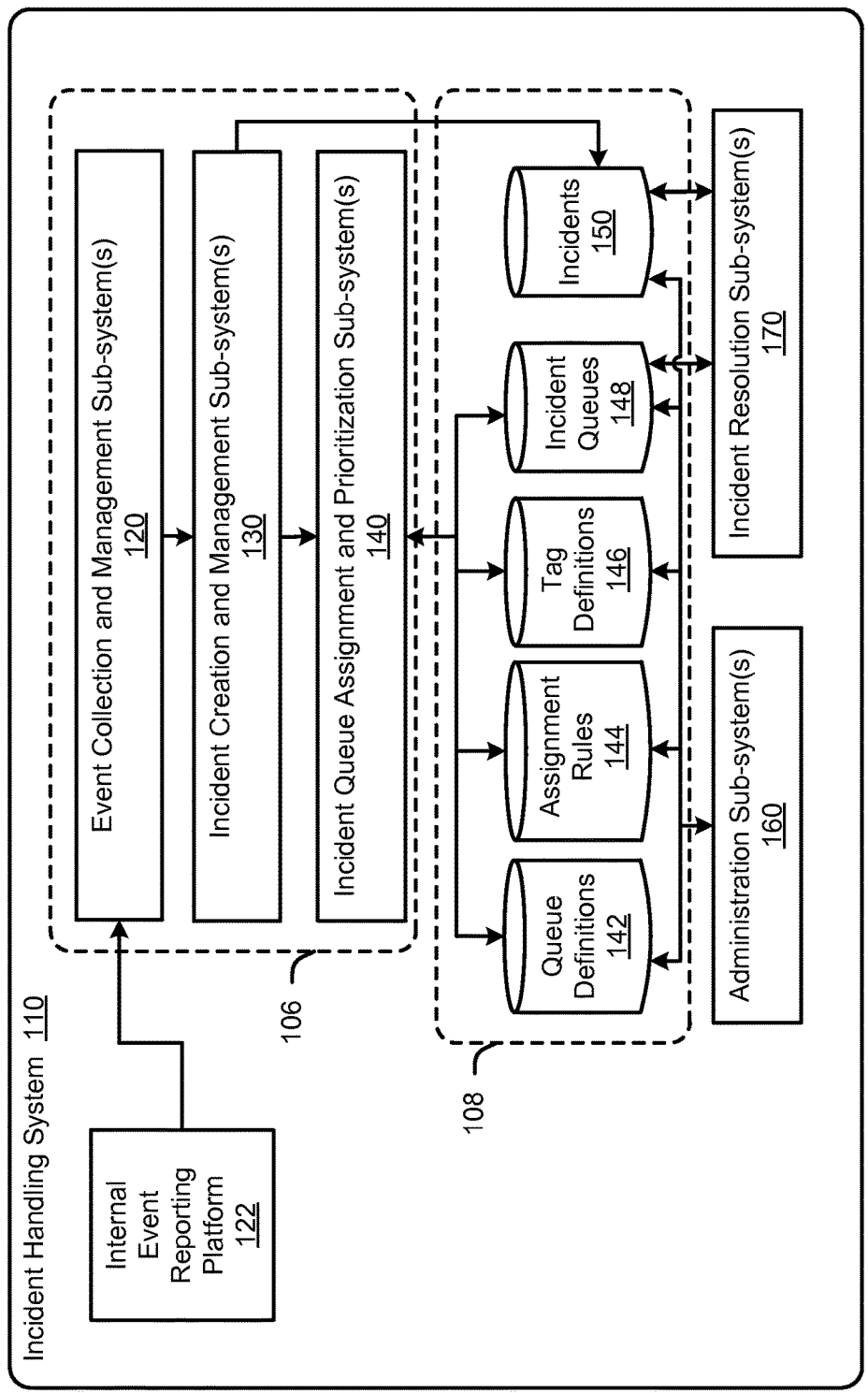
FIG. 1B schematically depicts an illustrative incident handling system in accordance with one or more embodiments of the disclosure.

Systems and methods in accordance with various embodiments of the present disclosure are directed to incident queue assignment and prioritization. An incident handling system as described herein may support highly customizable and automated assignment of incidents to incident queues and prioritization of the incidents within the queues. Both the assignment and prioritization of incidents may be based at least in part on a combination of definitions, rules, and scoring algorithms. Such a system may help ensure that incident resolution personnel are able to work on the next highest priority incident.

Incident queues may comprise dynamic sets of incidents assigned to or associated with them. Incidents associated with incident queues may be prioritized. While some incident queues may drive automated workflow processing, other incident queues may drive issue resolution by incident resolution agents. While an incident may be initially assigned to a particular incident queue and given a particular priority within that incident queue, the incident may be subsequently re-assigned to a second incident queue, have its priority changed, have its status changed, or be removed from the incident queue. An incident may also be assigned to more than one queue simultaneously, and may be removed from all the queues with which it is associated after it has been resolved in the context of one queue.

An incident queue may be an association of incidents that satisfy an incident queue assignment rule. An incident queue may be a non-transient data construct or, in some embodiments, a transient data construct. In some embodiments, incident queues may be dynamically generated and discarded.

Incidents may be created and stored in one or more incident repositories. Incident attributes may be modified by any of several sub-systems of the incident handling system or entities over the life-cycle of the incident.

In some embodiments, an incident resolution agent may subscribe to one or more incident queues simultaneously. In some embodiments, the incident handling system may obtain the "next highest priority" incident from a specific incident queue or across all subscribed incident queues.

In some embodiments, an incident may be serially assigned to more than one incident resolution agent during its course of resolution. The incident may be assigned to an agent only when the agent has it "locked" (e.g., is actively working on it). If the agent does not completely resolve the issue in the current session, he or she may route, re-assign, or otherwise release the incident. When the incident is released, it may once again be eligible for assignment to the next agent requesting the "next highest priority" incident for a queue holding that incident. Once an incident is ultimately closed, it may be removed from all the queues in which it appeared. In some embodiments, an agent may escalate an incident (e.g., change its service level or other attribute), which may cause it to be assigned to another queue.

Illustrative Architectures

Figure 2:
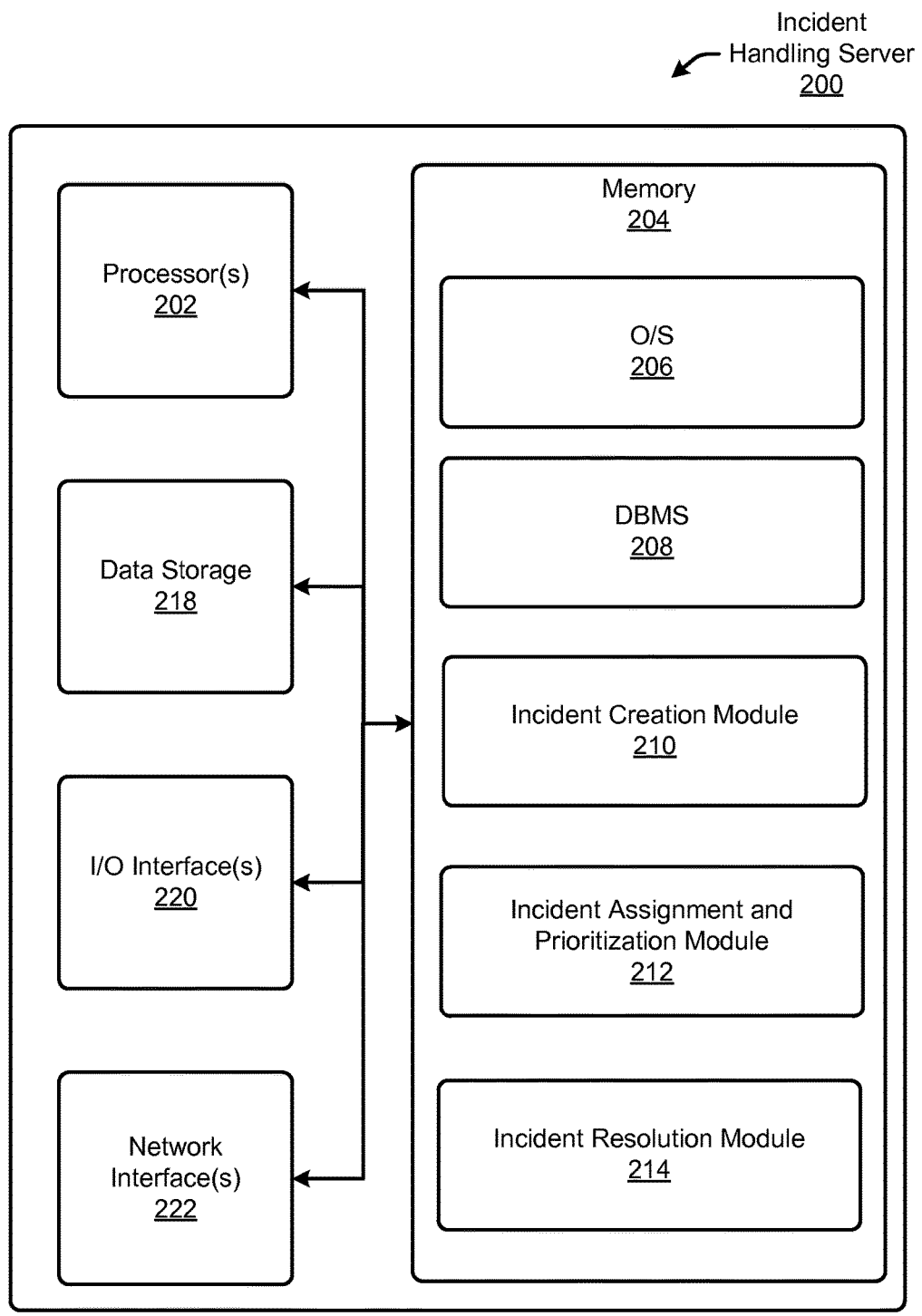
FIG. 2 schematically depicts an illustrative incident handling server in accordance with one or more embodiments of the disclosure.

FIG. 1A schematically depicts an illustrative networked architecture 100 for facilitating the assignment and prioritization of incidents in incident queues in accordance with one or more embodiments of the disclosure. FIG. 1B schematically depicts an illustrative architecture for an incident handling system 110. It should be appreciated that numerous other suitable configurations beyond the illustrative configurations depicted in FIGS. 1A-1B are within the scope of this disclosure. FIG. 2 schematically depicts an incident handling server 200 in accordance with one or more embodiments of the disclosure. The illustrative methods depicted in FIGS. 3-7 will be described in the context of the illustrative configurations shown in FIGS. 1A-1B and the illustrative incident handling server depicted in FIG. 2.

The illustrative networked architecture 100 may include an incident handling system 110 that may include one or more incident handling sub-system 106(1)-106(N) (generically referred to herein as incident handling sub-system(s) 106) and one or more local datastores 108. The networked architecture 100 may further include one or more external device(s) 102 and one or more networks 104.

The one or more networks 104 may include, but not be limited to, a wireless fidelity (Wi-Fi) network, a Wi-Fi Direct network, an NFC connection, a radio network, a cellular network, the Internet, a GPS network, a ZigBee® connection, a Bluetooth® channel, a dial-up connection over a public telephone system, a private network (both wide area and local area), proprietary protocol connections, and other wireless links, as well as hardwired connections, serial link connections, parallel link connections, or combinations thereof.

The incident handling sub-system(s) 106 may execute on one or more suitable computing devices including, but not limited to, one or more server computers, mainframe computers, workstation computers, personal computing devices, mobile computing devices, and so forth. It should be appreciated that the incident handling system 110 may further include various other components such as routers, gateways, switches, other computing devices, communicative links, or any other suitable components.

An external device 102 that hosts or otherwise provides access to an external event reporting platform 102A is also depicted in FIG. 1A. As will be described in more detail later in this disclosure, the incident handling system 110 may receive a report comprising data associated with an event 116 from the external event reporting platform 102A. An event may include, but is not limited to, a software error condition or fault reported from an external event reporting platform 102A, a user service issue reported from an external event reporting platform 102A, and/or a hardware error condition or fault reported from an external event reporting platform 102A or the external device 102 itself (e.g., via firmware). It should be noted that reporting devices may not be just external devices; they may also comprise devices co-hosted with the incident handling system 110. Examples of software error condition or user service issue events reported by the external event reporting platform 102A, may include software failures (e.g., abnormal terminations or "aborts"), failure to meet service levels, and reporting of a product or service issue on behalf of a user of the external device 102. Examples of hardware error condition events that may be reported by the external device 102 or the external event reporting platform 102A may include a device out of cash condition, a device out of paper condition, a dispensing problem (e.g., paper or cash jam), a processing problem (e.g., of a card), or the like. Examples of external devices 102 that may report events 116 may include any type of computing platform (e.g., mobile device, laptop, or the like), a network-connect computer peripheral, an ATM, a kiosk, a smart safes, a branch teller terminal, a cash recycling machine, or any of a wide variety of specialized devices (e.g., medical diagnostic, manufacturing plant machine or robot, controller, or the like).

In some embodiments, events 116 may be reported by devices co-hosted with the incident handling system 110 (e.g., within the entity running the incident queue assignment and prioritization sub-system), possibly in communication with an internal event reporting platform (e.g., depicted as 122 in FIG. 1B). In some embodiments, for certain hardware error condition events, the internal event reporting platform may not be needed. In some embodiments, for certain faults from external devices, the external event reporting platform may not be needed.

Now referring to FIG. 1B, an illustrative architecture for an incident handling system 110 is depicted in accordance with one or more embodiments of the disclosure. In brief overview, the incident handling system 110 may include one or more incident handling sub-systems 106 and one or more local datastores 108. The incident handling sub-systems may include but are not limited to an event collection and management sub-system 120, and incident creation and management sub-system 130, an incident queue assignment and prioritization sub-system 140, an administration sub-system 160, and an incident resolution sub-system 170. The one or more local data stores 108 may include but are not limited to a queue definitions repository 142, an assignment rules repository 144, a tag definitions repository 146, an incident queues repository 148, an incidents repository 150, and/or an events repository (not shown). An internal event reporting platform 122 may be in communication with an event collection and management sub-system (ECMS) 120. The ECMS 120 may receive an event 116 from one or more event reporting platforms 102A, 122, or from an external device 102 or similar internal device. The ECMS 120 may be in communication with an incident creation and management sub-system (ICMS) 130. The ICMS 120 may receive an event 116 from the ECMS 120, determine whether to create an incident 117 based at least in part on the received event 116. The ICMS 130 may store the incident 117 in an incident repository 150. The ICMS 130 may be in communication with the incident queue assignment and prioritization sub-system (IQAPS) 140. The IQAPS 140 may receive the incident 117 from the ICMS 130 and associate the incident 117 with one or more incident queues 118, which may in turn be stored in the incident queues repository 148. The IQAPS 140 may also be in communication with one or more local datastores 108 to facilitate incident queue 118 assignment and prioritization. The one or more local datastore 108 may include, but are not limited to, a queue definition repository 142, a queue assignment rules repository 144, a tag definitions repository 146, and/or an incident queues repository 148. Additionally, each or all of the local datastores 108 may be in communication with an administration sub-system 160 and/or an incident resolution sub-system 170.

An administration sub-system 160 with one or more user interfaces (UI(s)) may allow system administration personnel to create, modify, and/or delete queue definitions, tag definitions, and rules, as well as modify incidents and queues (e.g., change an incident's queue assignment, prioritization, status, or remove the incident from the incident queue).

An incident resolution sub-system 170 with one or more user interfaces (UI(s)) may allow incident resolution agents to subscribe to particular incident queues, request the next highest priority incident within a queue, and modify or remove an incident 117 responsive to incident resolution activity.

The ECMS 120 may receive events 116, process events 116, and provide them to the ICMS 120. In some embodiments, the events 116 may be received by the ICMS 130 directly. The ECMS 120 may communicate with one or more event sources. In some embodiments, events 116 may be either "pushed" from sources, whereas in other embodiments they may be "pulled" from sources. If events 116 are pushed from sources, the ECMS 120 may receive the events 116 and associated information. For example, the ECMS 120 may host a web service that may be called to report an event 116, host a message queue that may receive events 116, receive batch files in well-defined locations via well-defined communication mechanisms, or the like. If events 116 are "pulled" from sources, the ECMS 120 may actively direct the polling and retrieval, in accordance with operational configurations (e.g., schedules, network locations, interprocess communication mechanisms, or the like).

In some embodiments, the ECMS 120 may transform events 116 that have been received or obtained. For example, events 116 may be normalized into one or more well-defined formats that subsequent sub-systems can process. Received event data may be enhanced (e.g., to include time of receipt).

In some embodiments, the ECMS 120 may be stored in one or more event repositories. The event repositories may store events 116 that may be accessed and/or processed at a later time. In some embodiments, events 116 are maintained in event repositories for historical purposes, such as statistical analysis and data mining.

In some embodiments, the ECMS 120 may deliver the events 116 to the ICMS 130. The ECMS 120 may notify the ICMS 130 of a received or obtained event 116. In some embodiments, the ECMS 120 may notify the ICMS 130 after the event 116 has been transformed by the ECMS 120. In some embodiments, the method by which the event 116 was received by the ECMS 120 may be different from the way the event 116 is delivered to the ICMS 130. For example, an event source may be polled on a regular schedule for events 116 and any available events 116 may be retrieved asynchronously. However, each event 116 may be delivered immediately to the ICMS 130 via an application program interface (API) call.

The ICMS 130 may receive and process an event 116 to determine if an incident 117 should be created. In some embodiments, an incident 117 is similar to a "ticket" associated with an issue that needs to be resolved (e.g., by automated processing, external support entities, or by an incident resolution agent). An incident 117 may be generated responsive to the ICMS 130 receiving an event 116. In some embodiments, rules-based processing of the ICMS 130 may create incidents for only a subset of received events 116. Rules relating to incident creation may be hardcoded in the ICMS 130 software or may be accessed from an appropriate rules data repository. In some embodiments, multiple events 116 may be associated with a single incident 117 (e.g., multiple like events from different sources or multiple distinct events received in close proximity from a single source).

The ICMS 130 may create new incidents 117 as appropriate. In some embodiments, a data structure of the incident 117 may be created based at least in part on event attributes and/or other supplemental information. In some embodiments, the ICMS 130 may store and manage incidents 117. For example, incidents 117 may be stored in one or more repositories 150, from which they may subsequently be accessed and/or processed. In some embodiments, the one or more repositories 150 may be used for historical purposes (e.g., statistical analysis and data mining).

In some embodiments, the ICMS 130 may automatically handle and/or dispatch incidents based at least in part on one or more incident handling rules. In some embodiments, the ICMS 130 may trigger fully automated incident resolution or transmission of the incident 117 to a party other than an incident resolution agent. For example, a hardware incident may be transmitted to an external entity providing hardware support.

In some embodiments, the ICMS 130 may monitor the status of incidents 117. If automated resolution for an incident 117 is not possible or fails, or an incident resolution service level agreement has not been met (e.g., slow response from an external entity providing support), the incident 117 may be transmitted to the IQAPS 140 for handling by an incident resolution agent, as described below.

In some embodiments, the ICMS 130 may encompass ECMS 120 functionality if sources connect directly to the ICMS 130. The ICMS 130 may trigger incident queue assignment and prioritization by the IQAPS 140 for an incident 117 with an associated status indicating the incident requires attention. In some embodiments, the incident queue assignment and prioritization may be invoked via an API, database trigger, message queue, or the like. In some embodiments, the IQAPS 140 may poll the one or more incident repositories 150 to identify new incidents 117.

The IQAPS 140 may manage and optimize incident assignment for incident resolution agents. In some embodiments, the IQAPS 140 may process each incident 117 based at least in part on incident queue definitions and incident queue assignment rules. In some embodiments, the IQAPS 140 may process each incident 117 based also on tag definitions and tag assignment rules The IQAPS 140 may process an incident 117 to place it in one or more incident queues 118. In some embodiments, an incident 117 may be prioritized within the incident queue it is associated with based at least in part on one or more prioritization or scoring rules and/or scoring calculations. In some embodiments, an incident 117 may be associated with more than one incident queue 118. When an incident has been resolved, an incident resolution agent may mark the incident 117 as closed. The "closed" status of the incident indicates that the incident is closed with regards to all incident queues associated with the incident.

An incident 117 may be assigned or associated with an incident queue 118. The IQAPS 140 may "score" the incident based at least in part on one or more prioritization and/or scoring rules. In some embodiments, the prioritization and/or scoring rules may be stored in one or more rules repositories. In some embodiments, factors that may be used to score an incident 117 may include, but are not limited to, an incident categorization, one or more fault codes that drove the creation of the incident 117, the organization identified by the incident handling system 110 as being the primary servicer for the incident 117, a service level of the incident, and any tags that may be associated with the incident.

Each of the factors associated with prioritization in the incident queue 118 may be assigned a priority level, which may drive scoring of the incident 117 for inclusion and/or prioritization of the incident within an incident queue 118. The factors may be classified as (1) High Priority, (2) Medium Priority, (3) Low Priority, or (4) Exclude. Inclusion and/or prioritization rules (or scoring calculations or algorithms) may evaluate the priority levels for all factors associated with an incident in combination to determine inclusion of an incident within an incident queue and/or one of a small number of discrete priorities for the incident within the incident queue. In these calculations, some factors may be given more weight than others (e.g., one factor with a priority level of "Exclude" may cause the incident to not be included in the incident queue, irrespective of other factor priority levels).

The IQAPS 140 may process one or more incidents 117. Processing the one or more incidents 117 may involve applying all the prioritization and/or scoring rules associated with the incident queue 118 to an incident 117. More than one rule may be applied based on various incident attribute and/or tag values. In some embodiments, the association of tags to incidents may need to occur prior to the assignment and prioritization of incidents associated with an incident queue. In some embodiments, scoring may be based on a point system. Multiple rules may effectively add or subtract from a total number of points associated with the incident 117 and then the IQAPS 140 may order the incidents based on their respective scores. Individual prioritization/scoring rules or the sum total of points may map to one of a small number of discrete priorities (e.g., Very High, High, Low, and Very Low). Multiple prioritization/scoring rules yielding a same priority (e.g., High) may not necessarily increase the incident 117 to a higher priority. However, multiple rules yielding different priorities may cause an overall priority to increase or decrease. In some embodiments, the age of an incident 117 may be factored into prioritization (e.g., as a tie breaker if two incidents are identified as equivalent priority in association with an incident queue). Note that an incident assigned to different incident queues may have a different priority within each incident queue, in accordance with respective prioritization/scoring rules or calculations.

Incident assignment and prioritization may be performed on newly obtained or received incidents 117, pending incidents, or incidents that have already been assigned and/or prioritized. For example, if a new incident queue 118 is established or a new assignment rule is created, it may be desirable to re-evaluate all or some subset of incidents 117, potentially causing pending incidents to be associated with the new incident queue.

In some embodiments, incident processing may only be performed on incidents 117 that are eligible for optimization. Incidents that can be resolved by fully automated incident resolution, incidents that have been dispatched to entities other than an incident resolution agent, and/or incidents that are still within service level agreement periods may not be eligible for such processing.

FIG. 2 depicts an illustrative architecture 200 of an incident handling server 200 in accordance with one or more embodiments of the disclosure. The incident handling server 200 may be an instance of any suitable computing device, examples of which were identified in relation to the discussion of FIG. 1A. The incident handling server 200 may comprise one or more processors 202 and one or more memories 204 (generically referred to herein as memory 204). The processor(s) 202 may include any suitable processing unit capable of executing stored computer-executable instructions to receive or retrieve data from one or more data repositories, I/O devices, and/or network entities; process data; generate output data; store data in one or more data repositories; transmit data to I/O devices or network entities; and/or control the operation or use of various hardware resources or other components associated with the incident handling server 200. The computer-executable instructions may be stored, for example, in the memory 204 and may include operating system software, application software, and so forth. The processor(s) 202 may be configured to execute the computer-executable instructions to cause various operations to be performed. The processor(s) 202 may include any type of processing unit including, but not limited to, a central processing unit, a microprocessor, a Reduced Instruction Set Computer (RISC) microprocessor, a microcontroller, an Application Specific Integrated Circuit (ASIC), and so forth.

The memory 204 may store program instructions that are loadable and executable by the processor(s) 202, as well as data manipulated and generated by the processor(s) 202 during execution of the program instructions. Depending on the configuration and implementation of the incident handling server 200, the memory 204 may be volatile memory (memory that maintains its state when supplied with power) such as random access memory (RAM) and/or non-volatile memory (memory that maintains its state even when not supplied with power) such as read-only memory (ROM), flash memory, and so forth. In various implementations, the memory 204 may include multiple different types of memory, such as static random access memory (SRAM), dynamic random access memory (DRAM), unalterable ROM, and/or writeable variants of ROM such as electrically erasable programmable read-only memory (EEPROM), flash memory, and so forth.

The incident handling server 200 may further include additional data storage 218 such as removable storage and/or non-removable storage including, but not limited to, magnetic storage, optical disk storage, and/or tape storage. Data storage 218 may provide non-volatile storage of computer-executable instructions and other data. The non-volatile instances of memory 204 and/or the data storage 218, removable and/or non-removable, are examples of computer-readable storage media (CRSM).

The incident handling server 200 may further include communications connection(s) 222 that allow the incident handling server 200 to communicate with other network entities, which may be remote computing devices and/or software components, forming part of the networked architecture 100 depicted in FIG. 1A. For example, the incident handling server 200 may utilize the network interface(s) 222 to communicate with the external event reporting platform 102A, the network(s) 104, the internal event reporting platform 122, and so forth.

The incident handling server 200 may additionally include one or more input/output (I/O) interfaces 220, such as a keyboard, a keypad, a mouse or other pointing device, a pen, a voice input device, a touch input device, a display, speakers, a camera, a microphone, a printer, and so forth, for receiving user input and/or providing output to a user.

The memory 204 may include various program modules comprising computer-executable instructions that upon execution by the processor(s) 202 cause the incident handling server 200 to perform various operations. For example, the memory 204 may have loaded therein an operating system (O/S) 206 that provides an interface between other application software executing on the incident handling server 200 and hardware resources of the incident handling server 200. More specifically, the O/S 206 may include a set of computer-executable instructions for managing hardware resources of the incident handling server 200 and for providing common services to other application programs (e.g., managing memory allocation among various application programs). The O/S 206 may include any operating system now known or which may be developed in the future including, but not limited to, a Microsoft Windows® operating system, an Apple OSX™ operating system, Linux, Unix, a mainframe operating system such as Z/OS, a mobile operating system, or any other proprietary or freely available operating system.

The memory 204 may further include a database management system (DBMS) 208 for accessing, retrieving, storing, and/or manipulating data stored in one or more datastores. The DBMS 208 may use any of a variety of database models (e.g., relational model, object model, etc.) and may support any of a variety of query languages.

The memory 204 may further include various program modules comprising computer-executable instructions that upon execution by the processor(s) 202 cause the incident handling server 200 to perform various operations. The functionality provided by these various program/application modules will be described in more detail hereinafter through reference to various accompanying drawings.

The memory 204 may additionally include various other program modules that may support various associated functionality. For example, the memory 204 may include an incident creation module 210, an incident assignment and prioritization module 212, and an incident resolution module 214. Functionality supported by these various modules will be described in more detail through reference to the various illustrative methods depicted in the process flow diagrams of FIGS. 3-7.

The incident creation module 210 may provide functionality directed to receiving and processing an event 116 to determine if an incident 117 should be created and creating a new incident 117 as appropriate. The incident creation module 210 may also provide functionality directed to the storage and management of incidents 117.

The incident assignment and prioritization module 212 may provide functionality directed to manage and optimize incident 117 assignment to one or more incident queues 118. The incident assignment and prioritization module 212 may also provide functionality directed to processing all the incidents 117 associated with an incident queue 118. In some embodiments, the processing may be based at least in part on one or more prioritization rules. The one or more prioritization rules may be used to identify the next highest priority incident to be returned to a requesting incident resolution agent. Additionally, the incident assignment and prioritization module 212 may provide functionality directed to the generation and management of incident queues 118.

The incident resolution module 214 may provide functionality directed to facilitating resolution of an identified incident. The incident resolution module 214 may aid an incident resolution agent in identifying the next highest priority incident, obtaining data associated with the resolution of the incident, and modifying a status associated with the incident. For example, the incident resolution module 214 may permit an incident resolution agent to mark the incident as "resolved." If the incident cannot be resolved, the incident resolution module 214 may permit the incident resolution agent to release the incident so that the incident is still active in the one or more incident queues 118 it may populate. The incident resolution module 214 may also support the escalation and/or re-assignment of an incident to another incident resolution agent or supervisor.

It should be appreciated that software, firmware, or hardware components depicted as forming part of the illustrative architecture 200, or more particularly, the incident handling server 200, are merely illustrative and that some components may not be present or additional components may be provided in various embodiments. While various program modules have been depicted as being loaded in the memory 204, it should be appreciated that the functionality described as being supported by the program modules may be enabled by any combination of hardware, software, and/or firmware. It should further be appreciated that each of the above-mentioned modules depicted as being loaded into the memory 204 may, in various embodiments, represent a logical partitioning of functionality supported by the incident handling server 200. This logical partitioning is depicted for ease of explanation of the functionality supported and may not be representative of the structure of software, firmware, and/or hardware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality.

Those of ordinary skill in the art will appreciate that the illustrative networked architecture 100 depicted in FIG. 1A, the illustrative incident handling system depicted in FIG. 1B, and the illustrative incident handling server 200 depicted in FIG. 2 are provided by way of example only. Numerous other operating environments, system architectures, and device configurations are within the scope of this disclosure. Various embodiments of the disclosure may include fewer or greater numbers of components and/or devices than those depicted in FIGS. 1A, 1B, and 2 may incorporate some or all of the functionality described with respect to the illustrative architecture 100 depicted in FIG. 1A, the illustrative incident handling system depicted in FIG. 1B, illustrative incident handling server depicted in FIG. 2, or additional functionality.

Those of ordinary skill in the art will appreciate that any of the components of the architecture 100 may include alternate and/or additional hardware, software or firmware components beyond those described or depicted without departing from the scope of the disclosure. More particularly, it should be appreciated that software, firmware or hardware components depicted as forming part of any of the components of the architecture 100 are merely illustrative and that some components may not be present or additional components may be provided in various embodiments. While various program modules have been depicted and described with respect to various illustrative components of the architecture 100, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, firmware and/or hardware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Illustrative Process Flows

Figure 3:
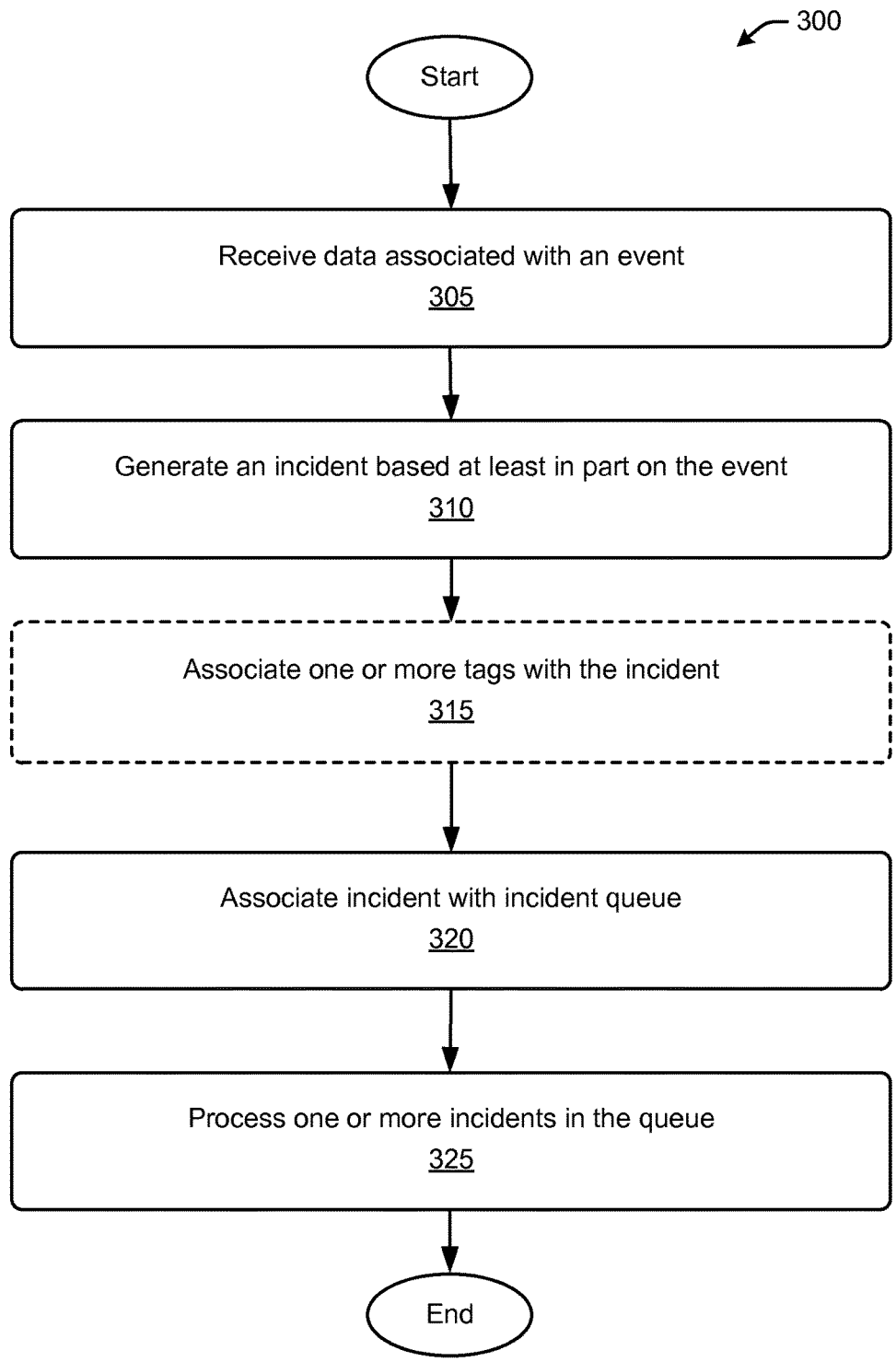
FIGS. 3-7 are process flow diagrams depicting illustrative methods for incident queue assignment and prioritization in accordance with one or more embodiments of the disclosure.
Figure 4:
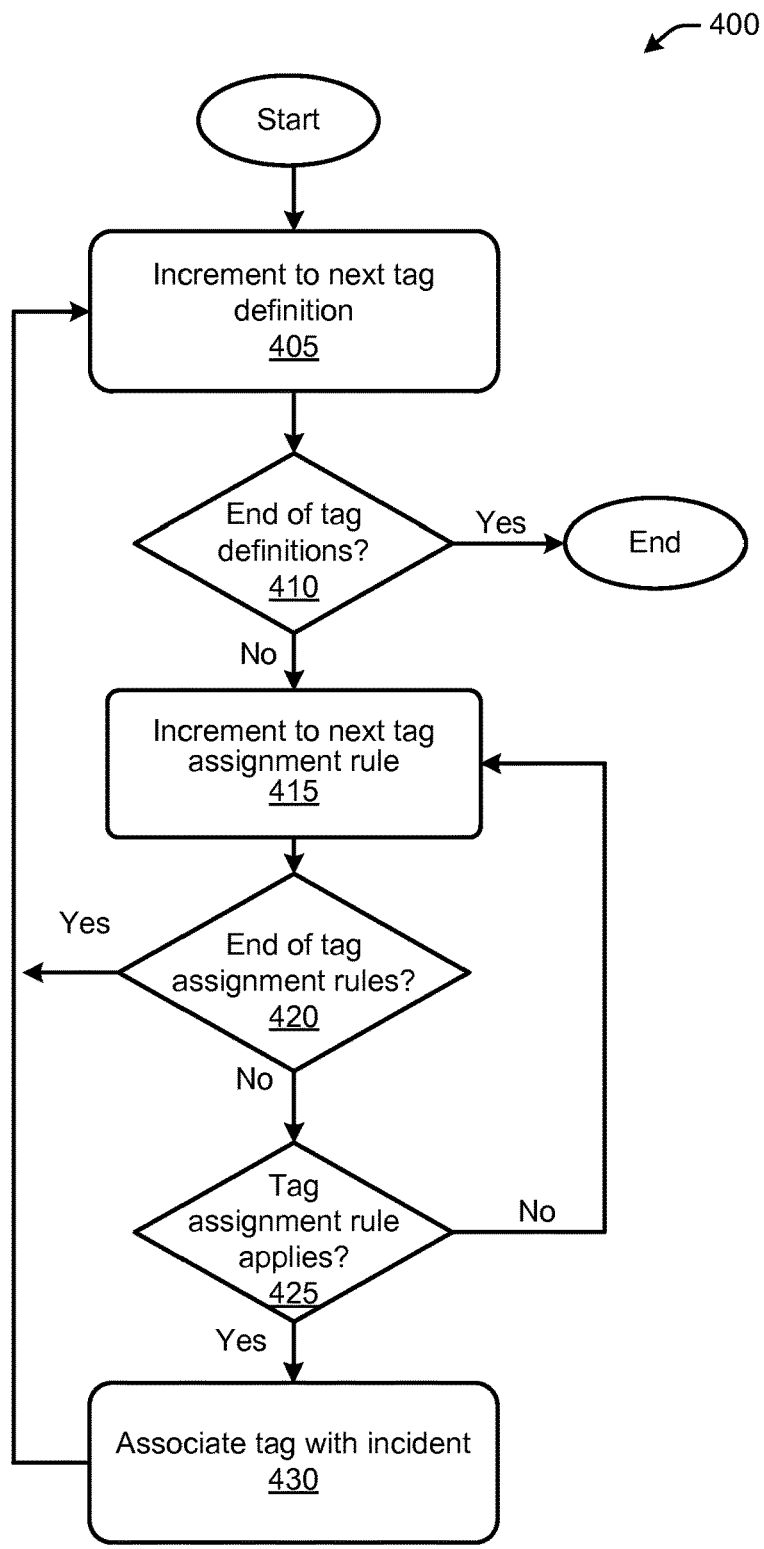
Figure 5:
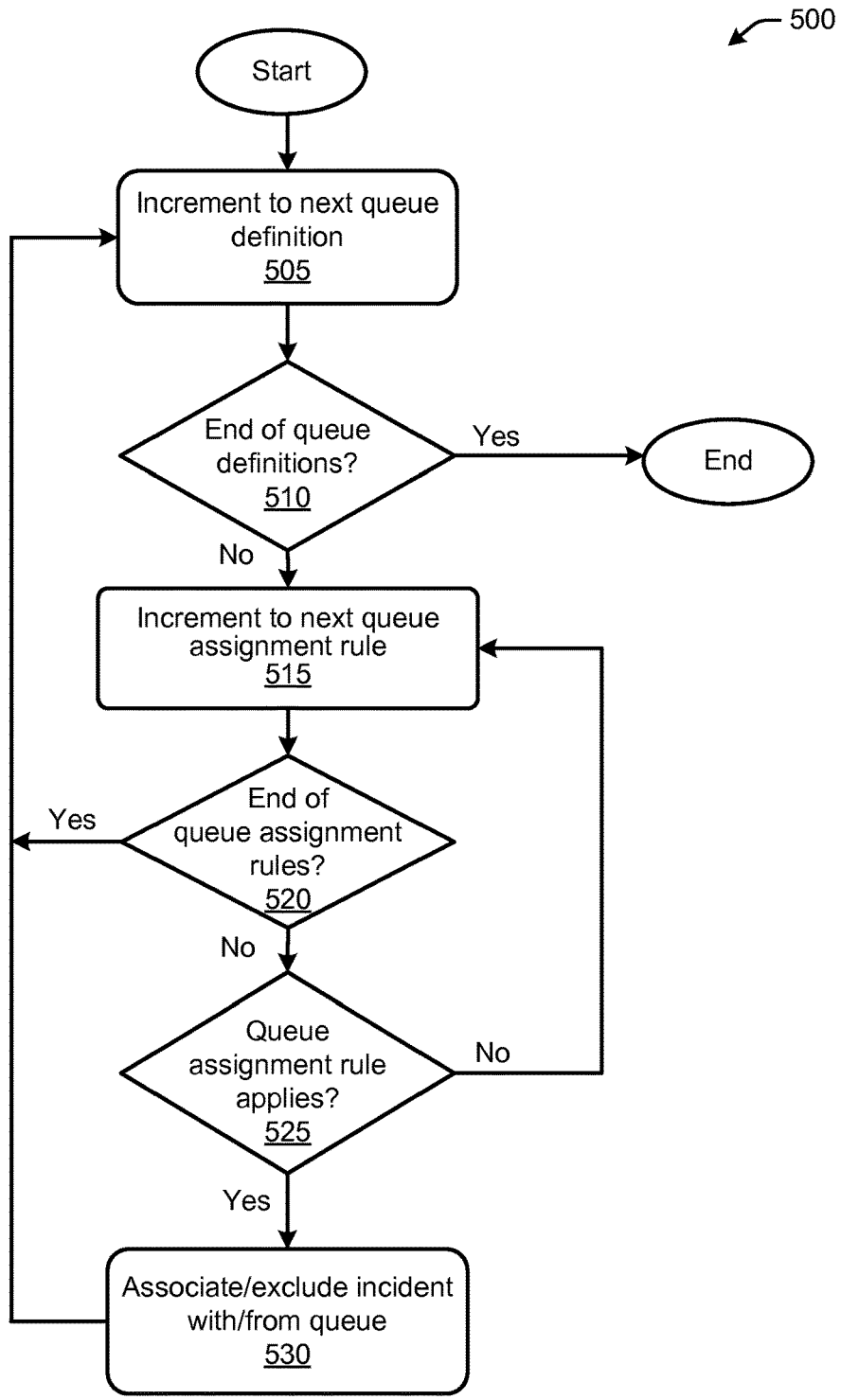
Figure 6:
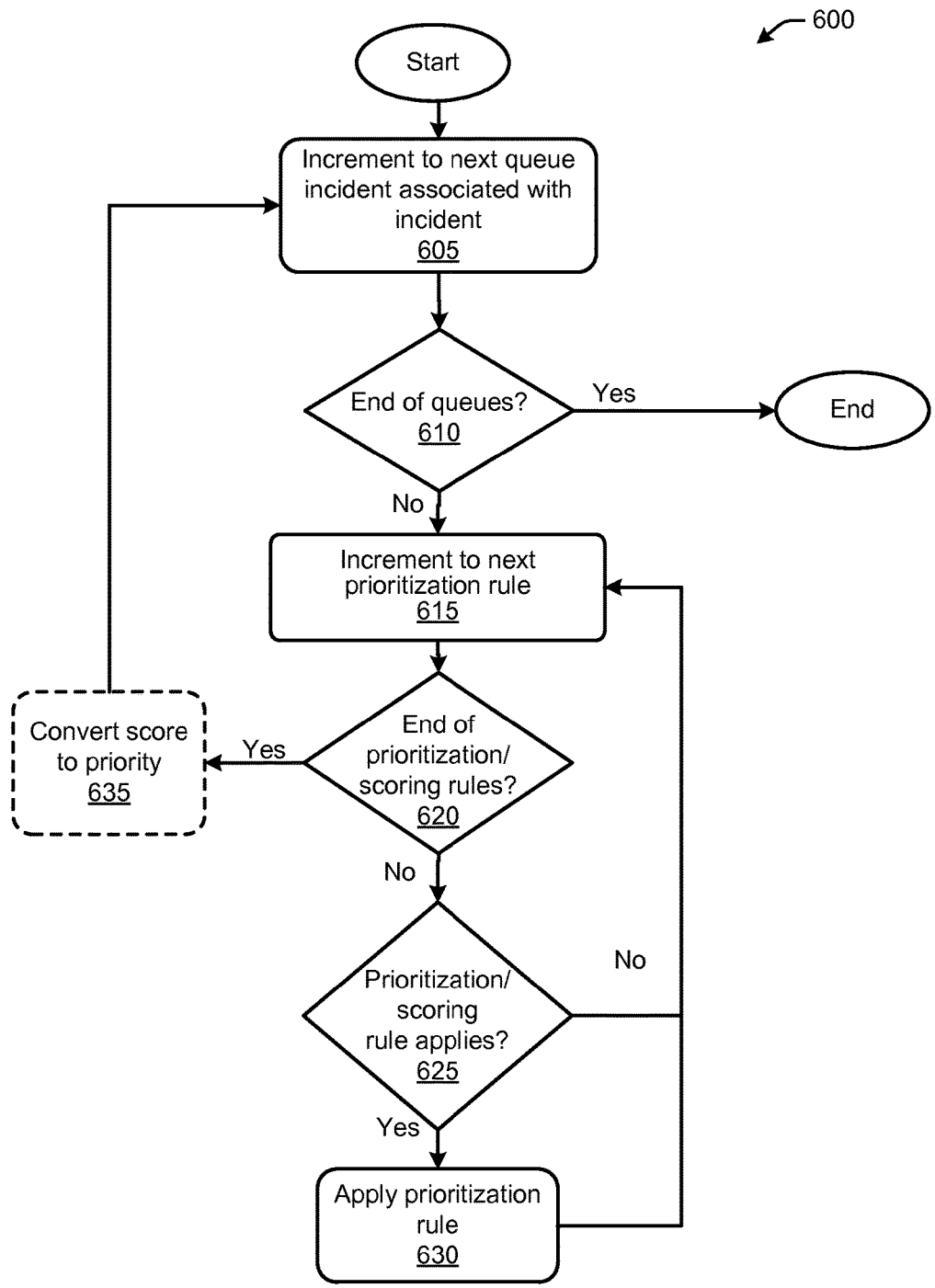
Figure 7:
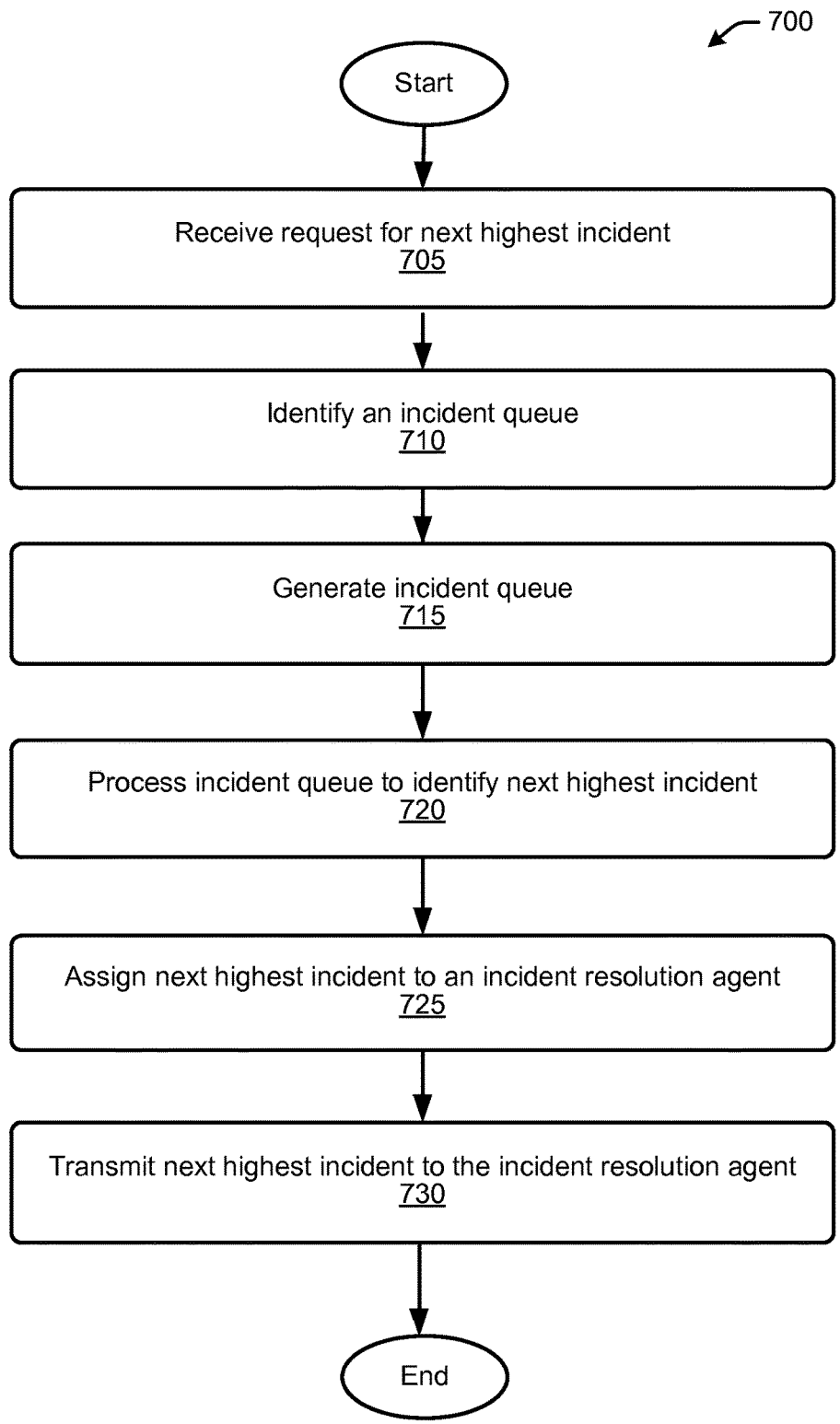

FIG. 3 is a process flow diagram depicting an illustrative method 300 for event collection and management, incident creation and management, and incident queue assignment and prioritization prior to an incident resolution action in accordance with one or more embodiments of the disclosure. FIG. 4 is a process flow diagram depicting an illustrative method 400 for processing to assign one or more tags to an incident in accordance with one or more embodiments of the disclosure. FIG. 5 is a process flow diagram depicting an illustrative method 500 for processing to assign an incident to one or more incident queues. FIG. 6 is a process flow diagram depicting an illustrative method 600 for processing to prioritize an incident within each incident queue to which it is assigned. FIG. 7 is a process flow diagram depicting an illustrative method 700 for incident assignment and prioritization in response to receiving a request on behalf of an incident resolution agent for a next highest priority incident. The illustrative methods 300-700 will be described through reference to the illustrative networked architecture depicted in FIG. 1A, the illustrative architecture of an incident handling system 110, and the illustrative configuration and implementation of a incident handling server 200 as depicted in FIG. 2. However, it should be appreciated that the illustrative methods 300-700 may be performed in connection with any networked architecture and configuration within the scope of this disclosure. Further, while various operations are depicted in the process flow diagrams depicted in FIGS. 3-7, it should be appreciated that any of the depicted operations are optional and that, in various embodiments, any of the operations may not be performed. Depicted operations may also be performed in a different order. Further, in various embodiments, additional operations may be performed beyond those which are depicted.

Now referring to FIG. 3, in brief overview, at block 305, incident handling system 110 may receive data associated with an event 116. At block 310, the incident handling system 110 may generate an incident based at least in part on the event. At block 315, the incident handling system 110 may optionally associate one or more tags with the incident. At block 320, the incident handling system 110 may associate the incident with an incident queue. At block 325, the incident handling system 110 may process the one or more incidents in the incident queue.

At block 305, the incident handling system 110 may receive data associated with an event 116. In some embodiments, the event 116 may be a software error condition reported from an event reporting platform 102A, 122, a customer or user service issue reported from an event reporting platform 102A, 122, and/or a hardware error condition reported from a device 102 or an event reporting platform 102A, 122.

At block 310, the incident handling system 110 may generate an incident 117 based at least in part on the event 116. In some embodiments, the incident handling system 110 may evaluate the event 116 to determine whether an incident 117 should be created. If the incident handling system 110 determines that an incident 117 should be created, the incident handling system 110 may create a data structure of the incident 117 from the data associated with the event 116.

In some embodiments, an identity of an incident 117 may be received from the ICMS 130. In some embodiments, the IQAPS 140 may receive the identity of the incident 117 from the ICMS 130. The identity of the incident 118 may be a referential identifier to an incident 117 stored in a repository 150. In some embodiments, the identity of the incident 117 may be a data structure comprising all the attributes associated with the incident 117. The incident 117 and its attributes may be identified for subsequent processing. Although this process flow specifies a single incident, the process flow may also be for multiple incidents. For example, the method 300 may be performed iteratively as necessary (e.g., to process an incoming stream of requests, a message queue, or even a batch file).

At block 315, the incident handling system 110 optionally associate one or more tags with the incident 117. A tag may be a convenient way of referencing or grouping incidents. Incident queue assignment rules may reference tags as well as incident attributes. Tags may effectively aggregate a variety of similar but distinct fault codes, add flexibility to queue assignment, and support short-term needs to partition certain categories of incidents 117.

In some embodiments, a tag may be a way of reference a or grouping certain incidents. Then, the queue assignment rules may reference tags as well as incident attributes. Tags may effectively aggregate a variety of similar but distinct fault codes, add flexibility to queue assignments, and support short-term needs to partition certain categories of incidents. In some embodiments, tag definitions may comprise a set of attributes that may include, but are not limited to, a name identifying the tag, one or more incident attribute and value pair(s) identifying incidents 117 to be assigned or associated with the tag, one or more rules identifying incidents 117 to be assigned or associated with the tag, one or more identifiers associated with one or more tag definition rules, a visual element (e.g., color or graphical icon) to be associated with the tag in certain user interfaces or presentations and/or reports, and the like.

In some embodiments, a tag may be a non-hierarchical keyword, value, or term associated with an incident. For example, a tag definition may be named "Georgia" and all incidents that are within the geographic boundaries of Georgia may be associated with the tag. In another example, a tag definition may be named "ATM" and all incidents that are generated or associated with an ATM issue may be associated with the tag. In another example, a tag definition may be named "High Priority" and all incidents that are associated with a particular fault code may be associated with the "High Priority" tag. Tags may enable the system to filter or identify all incidents based on the specified tag to be identified and in some embodiments, only those incidents associated with a tag may be used processed for assignment and prioritization for an incident queue.

In some embodiments, tag definitions may be stored in and retrieved from a tag definitions repository 146. In some embodiments, tag assignment rules, if independent of tag definitions, may be stored in and retrieved from an assignment rules repository 144.

Since incident queue assignment rules may make use of tags, tag definitions may need to be evaluated prior to incident queue assignment and prioritization.

In some embodiments, tag definitions may be evaluated and relevant tag assignment rules may be applied to associate one or more tags with the incident 117. Further details associated with this process are described below in relation to FIG. 4.

At block 320, the incident handling system 110 may associate the incident 117 with an incident queue 118. In some embodiments, queue definitions may be evaluated and relevant queue assignment rules may be applied to associate the incident 117 with one or more incident queue(s) 118. The queue assignment rules may reference tags as possible conditions for assignment. In some embodiments, the identity of the incident 117 may be used to associate the incident with an incident queue 118. Further details associated with this process are described below in relation to FIG. 5.

At block 325, the incident handling system 110 may process the one or more incidents 117 in the one or more incident queues 118 with which the incident 117 is associated. In some embodiments, the incident handling system 110 may process the one or more incident queues 118 based at least in part on one or more prioritization or scoring rules and/or scoring calculations to prioritize the incident within the respective incident queues 118. The prioritization or scoring rules and/or scoring calculations may reference tags as possible conditions for prioritization. Further details associated with this process are described below in relation to FIG. 6.

FIG. 4 is a process flow diagram depicting an illustrative method 400 for processing to associate one or more tags to an incident 117 in accordance with one or more embodiments of the disclosure. At block 405, the incident handling system 110 may increment a pointer to the next tag definition. At block 410, the incident handling system 110 may determine whether the processing has reached the end of the tag definitions. If it is determined that the end of the tag definitions has been reached, then the process end. If it is determined that the end of the tag definitions has not been reached, then at block 415, a pointer may be incremented to the next tag assignment rule. The incident handling system 110 may determine whether the process has reached the end of tag assignment rules. If the process has reached the end of the tag assignment rule, the process may return to block 405. If the incident handling system 110 determines that the end of the tag assignment rules has not been reached, then at block 425, the incident handling system then may evaluate whether the current tag assignment rule applies. If the incident handling system 110 determines that the current tag assignment does not apply, then the process may return to block 415. If the incident handling system 110 determines that the current tag assignment rule applies, then at block 430, the tag may be associated with the incident 117. Once a tag has been associated with an incident 117, the processing may return to block 405.

FIG. 5 is a process flow diagram depicting an illustrative method 500 for processing to associate an incident 117 to one or more incident queues 118. At block 505, the incident handling system 110 may increment a pointer to the next incident queue definition. In some embodiments, if processing of the incidents 117 occurs independent of a request from an incident resolution agent, then all the incident queue definitions may be evaluated to ensure assigned of an incident to all appropriate incident queues. If the processing of incidents 117 occurs in response to a request from an incident resolution agent, then only incident queue definitions associated with the incident queue 118 associated with the incident resolution agent may be evaluated. In some embodiments, a subset of incident queues definitions (less than all of the available incident queue definitions) may be evaluated. In some embodiments, the subset of the incident queue definitions may be evaluated in association with a set of incident queues being restructured or reestablished.

At block 510, the incident handling system 110 may evaluate whether the process has reached the end of the incident queue definitions. Reaching the end of the incident queue definitions may be an indication that all the incident queue definitions have been processed and the process may end. If the incident handling system 110 determines that the process has not reached the end of the incident queue definitions, then at block 515, the incident handling system 110 may increment a pointer to the next incident queue assignment rule associated with the current incident queue definitions. At block 520, the process may determine whether the incident queue assignment rules have been reached. If the end of the incident queue assignment rules have been reached, then the process may return to block 505. If the end of the incident queue assignment rules has not been reached, then at block 525, the incident handling system 110 may determine whether the incident queue assignment rule applies. If the incident queue assignment rule does not apply, then the process may return to block 515. If the incident queue assignment rule does apply, then at block 530, the incident 117 may be associated with the current incident queue 118. In some embodiments, the incident 117 may be excluded from the current incident queue 118 based at least in part on the incident queue assignment rule. Upon associating or excluding the incident 117 from the incident queue 118, the process may return to block 505. In some embodiments, queue definitions may be stored in and retrieved from a queue definitions repository 142 and/or queue assignment rules may be stored in and retrieved from an assignment rules repository 144.

In some embodiments, an incident queue 118 may comprise a set of prioritized incidents 117 that have a common element or attributes. In some embodiments, an incident queue may be stored in and retrieved from an incident queues repository 148. Queue definitions may comprise a set of attributes that may include, but are not limited to, a name identifying the incident queue 118, one or more identifiers of queue assignment rules that control assignment or association of an incident 117 to the incident queue 118, one or more identifiers of prioritization and/or scoring rules that control prioritization of an incident 117 associated with an incident queue 118, and the like.

Incident queues may be a way to effectively partition incident resolution activity. Typically, a particular incident queue may be associated with one or more teams of incident resolution agents, each team possibly having expertise with particular types of incidents. For example, a financial institution may establish three ATM-related queues as follows: Incident Queue 1: easy incidents for new/inexperienced incident resolution agents; Incident Queue 2: cash-related incidents for incident resolution agents experienced with such issues; and Incident Queue 3: complex non-cash incidents requiring attention by other experienced incident resolution agents.

In some embodiments, incident queues may be stable once established. Additional incident queues 118 may be created for short periods of time to address particular needs. For example, the financial institution may utilize the three Incident Queue examples identified above. The financial institution may then note an increase of network-related incidents (e.g., a subset of complex incidents assigned to Incident Queue 3). The financial institution may create a new incident queue for just these incidents and assign a team of incident resolution agents to address these in a prioritized manner. Then this new incident queue may be discarded after the network-related incident(s) have been resolved and the surge in such incidents has diminished.

In some embodiments, incident queue assignment rules may be based on incident attributes, which may include one or more assigned tags. The type of an event 116 or the type of an event source (e.g., device or software system) may directly determine association of the incident 117 with a particular incident queue 118. For example, if the value associated with an event 116 is 12345, an incident queue assignment rule may associate the incident with Incident Queue A, whereas if an event source is ATM, another incident queue assignment rule may associate the incident with Incident Queue B.

In some embodiments, incident queue assignment rules may explicitly identify certain types of incidents that should not be placed in a queue. For example, if [event source=kiosk] the rule may require the incident be excluded from Incident Queue B.

Queue assignment rules may be more complex, involving more than one attribute in a particular incident. For example, if [event source=ATM] and [event source geography=Georgia] and [event source location=retail mall], the rule may require the incident be associated with Incident Queue C.

Queue assignment rules may involve Boolean operations, dynamic evaluations, conditional logic, and the like.

In some embodiments, each queue assignment rule may be associated with an identifier that may then be included in appropriate queue definitions. In some embodiments, a particular rule may be associated with more than one incident queue.

FIG. 6 is a process flow diagram depicting an illustrative method 600 for processing to prioritize an incident 117 within each incident queue 118 to which it is assigned. At block 605, a pointer may be incremented to the next incident queue 118 the incident 117 to which the incident 117 has been assigned. At block 610, the incident handling system 110 may determine whether the end of the incident queues 118 associated with the incident 117 have been reached. If the end of the incident queues 118 associated with the incident 117 have been reached, the process may terminate. If the incident handling system 110 determines that the end of the incident queues 118 has not been reached, then at block 615, a pointer may be incremented to the next prioritization and/or scoring rule associated with the current incident queue 118. The incident handling system 110 may determine, at block 620, whether the end of the prioritization rules has been reached. If the end of the prioritization rules have been reached, then the process may convert the score associated with the incident 117 to a priority at block 635. In some embodiments, block 635 may be optional. Block 625 may not be necessary if the prioritization/scoring rules define discrete priorities in the first place, or if the system 110 operates on a score within a range rather than a finite set of discrete priorities.

If the end of the prioritization rules have not been reached, then a determination is made at block 625 as to whether the current prioritization rule applies. If the prioritization/scoring rule applies, then the process may execute the rule at block 630 and then proceed back to block 615. The rule may establish or modify a point score or assign a discrete priority. Unlike the application of tag assignment rules or incident queue assignment rules, the processing may not stop after the first applicable prioritization/scoring rule is encountered for an incident queue 118. Additional applicable prioritization/scoring rules may modify a score up or down, so all rules must be evaluate/executed and applied as appropriate.

In some embodiments, the incident queue assignment and prioritization may be triggered in response to a request from an incident resolution agent for the "next highest priority" incident. The ICMS 130 may not trigger the IQAPS 140 after an incident 117 is created and placed in an appropriate incidents repository 150. An incident queue 118 may not be a non-transient data structure. Rather, an incident queue may be created afresh every time an incident resolution agent requests a "next highest priority" incident. The incident queue 118 may be discarded after an incident 117 is assigned to the incident resolution agent. Since the request for a "next highest priority" incident may be from a specific incident resolution agent, and in the context of a subscription to a particular incident queue 118, a single incident queue 118 may be dynamically generated (and the incidents therein prioritized) at a time. Another incident resolution agent subscribed to a different incident queue 118 may trigger the dynamic generation of a second incident queue 118. The same incident 117 may appear in both the first incident queue and the second incident queue. In some embodiments, mechanisms (e.g., database locking) may prevent an incident 117 from being assigned to two different incident resolution agents simultaneously.

FIG. 7 is a process flow diagram depicting an illustrative method 700 for incident assignment and prioritization. At block 705, the incident handling system 110 may receive a request for the "next highest incident." The request may have been generated on behalf of an incident resolution agent via the incident resolution sub-system 170.

At block 710, the incident handling system 110 may identify an incident queue 118. In some embodiments, the incident queue 118 may be identified based at least in part on the received request. In some embodiments, an incident resolution agent may only subscribe to one incident queue 118 at a time, so the incident resolution agent session may be associated with a particular incident queue 118. In some embodiments, an incident resolution agent may subscribe to multiple incident queues 118. In such scenarios, a particular incident queue 118 may be identified in association with the received request. For example, the incident resolution agent may have specified a particular queue using an interface of the incident handling system 110.

At block 715, the incident handling system 110 may generate an incident queue 118. In some embodiments, a process of the incident handling system 110 may dynamically generate the identified queue. In effect, this may be a pass of a portion of FIG. 5 across all incidents (or conceivably some subset) in the context of just the identified queue. The IA'S 140 functionality may be leveraged to generate the identified queue 118. The queue definitions for the identified queue may be retrieved the queue definitions repository 142 and may be used to determine associated queue assignment rules, which may be retrieved from the assignment rules repository 144. In some embodiments, all available incidents 117 may be processed to generate a transient incident queue 118 in memory 204. Available incidents 117 may include incidents that (1) have not been processed automatically, resolved, or closed, (2) are not being handled by an external entity and still within a service level agreement response period, and/or (3) are not currently assigned to another incident resolution agent. Each incident 117 may be processed, such as by a method as described in FIG. 5. In some embodiments, if tags are utilized by the incident handling system 110, tags may have been assigned to the incidents 117 prior to the generation of incident queues 118.

At block 720, the incident handling system 110 may process the incident queue 118 to identify the next highest incident. In some embodiments, after the transient incident queue is generated, a process may prioritize each incident 117 within the incident queue 118, such as by a pass of a portion of FIG. 6 for just the identified queue (skipping blocks 605 and 610 and associated looping).

At block 725, the incident handling system 110 may assign the next highest priority incident to an incident resolution agent. The "next highest priority" incident within the transient incident queue may be identified and assigned to the incident resolution agent who sent the request. If more than one incident has the same priority/score, one or more rules may be applied to determine the "next highest priority" incident (e.g., the oldest incident may be selected as a tie-breaker).

At block 730, the incident handling system may transmit the next highest incident to the incident resolution agent. In some embodiments, a response comprising an indication of the "next highest priority" incident may be transmitted for presentation to the incident resolution agent. Once the incident resolution agent has received the incident 117 and commences working on it through the incident resolution sub-system 170, the incident queue 118 may be discarded.

Illustrative Interfaces

Figure 8:
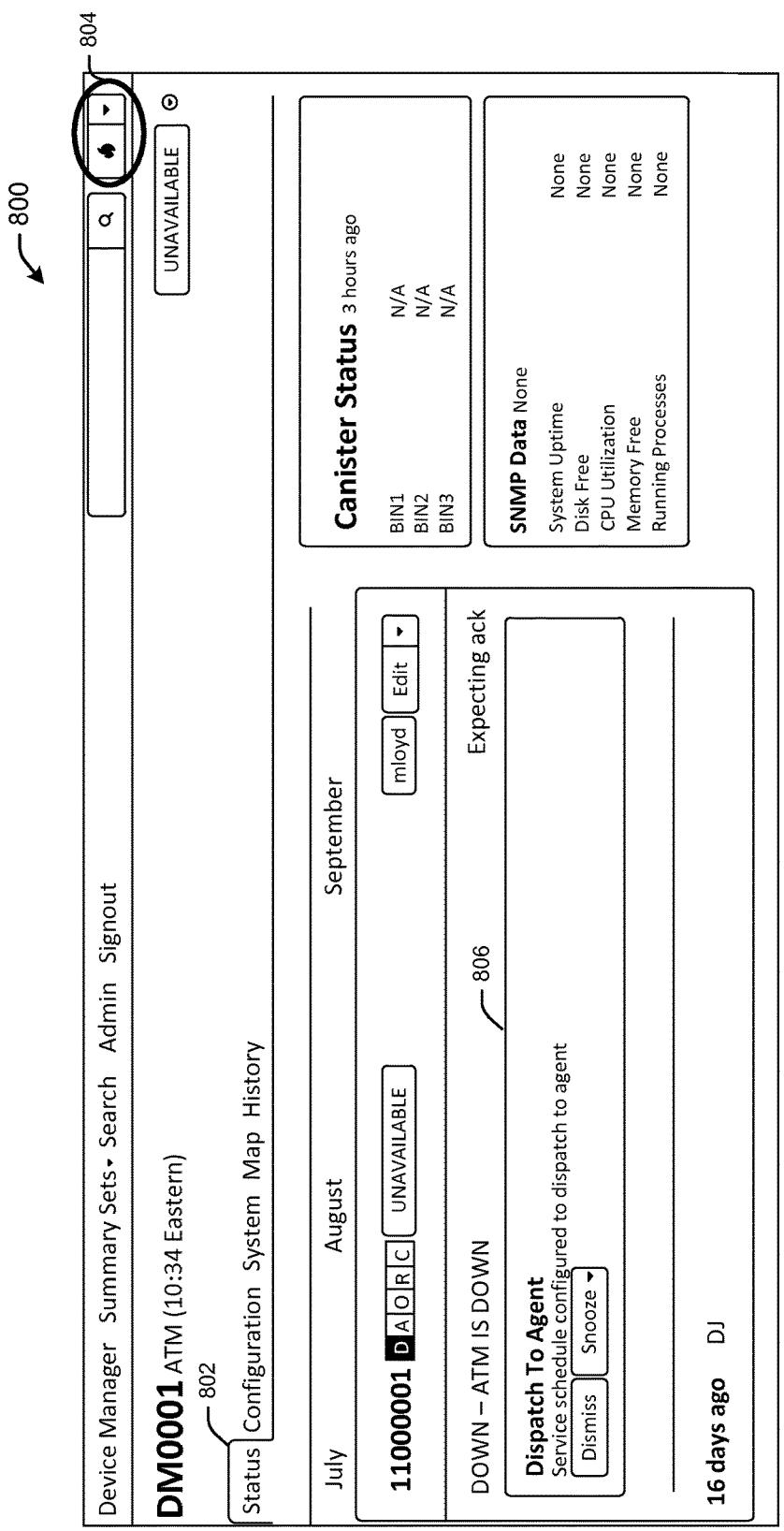
FIGS. 8-9 illustrate presentations of information associated with incident queue assignment and prioritization in accordance with one or more embodiments of the disclosure.

FIG. 8 depicts an illustrative embodiment 800 of an incident associated with an incident queue viewed by an incident resolution agent. Incident queues may aid incident resolution agents to request the next prioritized incident from the incident handling system 110, which may save them time in searching for and identifying priority incidents that require attention. In FIG. 8, element 802 indicates the status of a current incident. Element 806 is a message that may be displayed to an incident resolution agent regarding the current status of an incident. If the incident resolution agent selects the next incident button 804, the incident resolution sub-system 170 may generate a request to the incident handling system 110 for the next highest priority incident.

Figure 9:
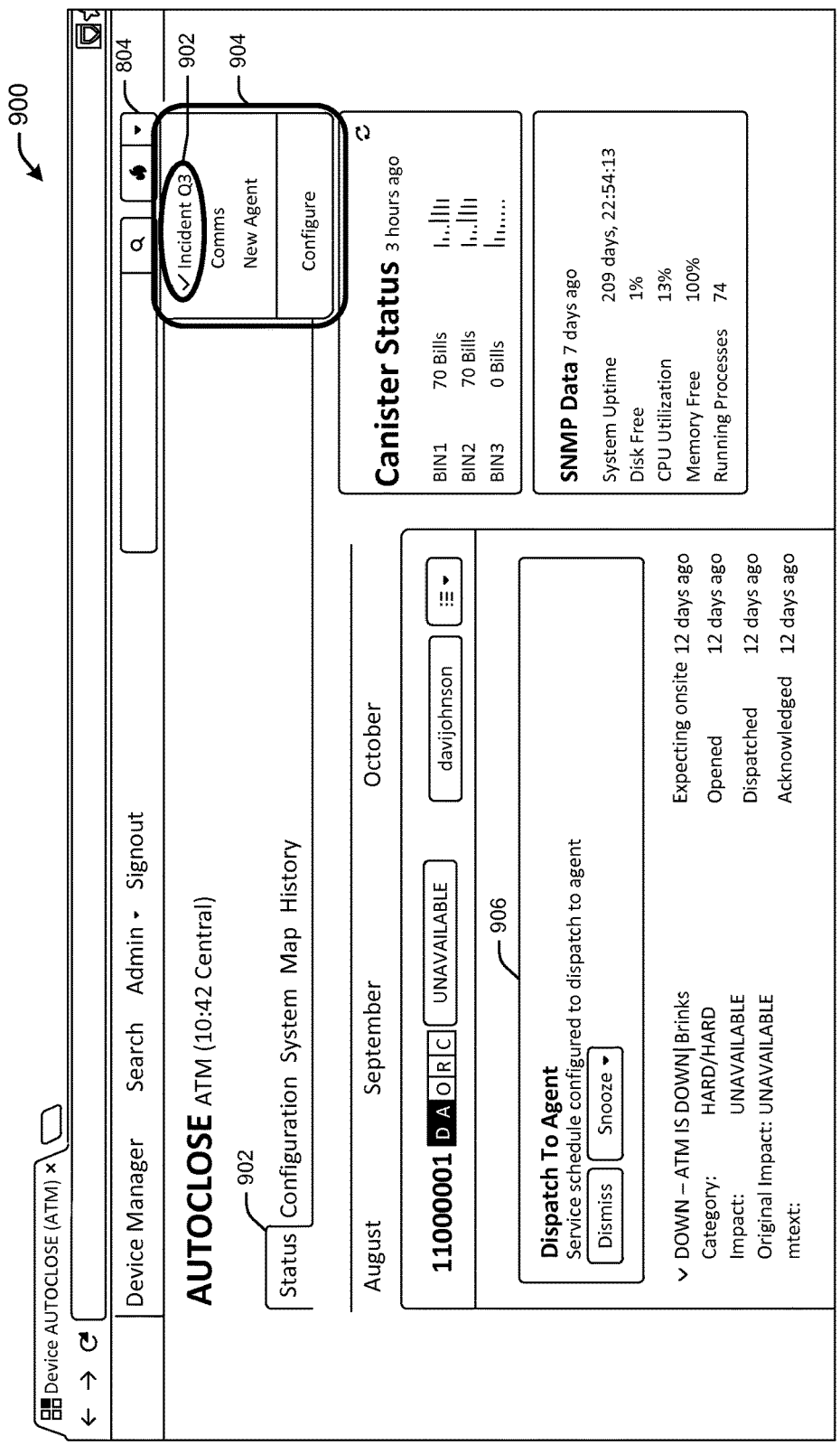

FIG. 9 also depicts an illustrative embodiment 900 of an incident associated with an incident queue viewed by an incident resolution agent. Responsive to an incident resolution agent selecting the next incident button 804, the incident resolution sub-system 170 may present the agent with a drop down menu 904 to select a particular incident queue 118 from which to request the next highest priority incident. Displayed in the drop down menu 904 is an incident queue named "Incident Q3" 902. If the incident resolution agent selects the incident queue "Incident Q3," 902 the incident handling system 110 may identify the next highest priority incident from the incidents associated with the incident queue.

While various illustrative presentations of the information and types of content have been described in connection with FIGS. 8-10, it should be appreciated that numerous other variations, modifications, and so forth are within the scope of this disclosure. Further, although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, although specific example embodiments have been presented, it should be appreciated that numerous other examples are within the scope of this disclosure.

Additional types of CRSM that may be present in association with any of the components described herein (e.g., any of the components of the networked architecture 100) may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, solid-state memory devices, or any other medium. Combinations of any of the above are also included within the scope of CRSM.

Alternatively, computer-readable communication media may include computer-readable instructions, program modules, or other data transmitted within a data signal, such as a carrier wave, or other transmission. Examples of computer-readable communication media, whether modulated using a carrier or not, include, but are not limited to, signals that a computer system or machine hosting or running a computer program can be configured to access, including signals downloaded through the Internet or other networks. For example, the distribution of software may be an Internet download. Note, however, as used herein, CRSM does not include computer-readable communication media.

Although embodiments have been described in language specific to structural features and/or methodological acts, it is to be understood that the disclosure is not necessarily limited to the specific features or acts described. Rather, the specific features and acts are disclosed as illustrative forms of embodiments of the disclosure. Conditional language such as, for example, "can," "could," "might," or "may," unless specifically stated otherwise, or unless otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. One or more computer-readable media storing computer-executable instructions that responsive to execution by one or more processors cause fully-automated operations to be performed, the fully-automated operations comprising:

receiving information associated with an incident requiring resolution via one or more networks and on behalf of an automated teller machine (ATM), wherein the information associated with the incident requiring resolution is (a) indicative of at least one of a software fault of the ATM or a hardware fault of the ATM, and (b) stored in one or more memory storage areas as a non-transient data construct;

responsive to receiving the information associated with the incident requiring resolution, electronically assigning a tag corresponding to a tag definition that enables referencing or aggregating a set of one or more incidents, wherein the set of one or more incidents comprises one or more fault codes, to the incident by:

(a) automatically determining whether the incident satisfies a tag rule corresponding to the tag definition, and (b) responsive to determining that the incident satisfies the tag rule corresponding to the tag definition, electronically assigning the tag to the incident;

receiving a request for a next highest priority incident, the request received on behalf of an incident resolution agent as input via a user interface;

responsive to receiving the request for the next highest priority incident, dynamically generating a transient incident queue for identifying the next highest priority incident, wherein the transient incident queue (a) corresponds to an incident queue definition enabling aggregation of incidents for resolution, and (b) is stored in the one or more memory storage areas as a transient data construct;

associating a plurality of incidents with the transient incident queue, wherein (a) at least a subset of the plurality of incidents is assigned the tag, (b) the plurality of incidents comprises the incident, and (c) associating the plurality of incidents with the transient incident queue comprises:

(1) automatically determining whether the incident satisfies a queue assignment rule of one or more queue assignment rules corresponding to the incident queue definition, and (2) responsive to determining that the incident satisfies the queue assignment rule, electronically assigning the incident to the transient incident queue, wherein (i) the one or more queue assignment rules are stored in a queue assignment rules repository and are applied using one or more selected from the group consisting of Boolean operations, dynamic evaluations, and conditional logic, and (ii) the transient incident queue is identifiable based at least in part on the incident resolution agent;

processing the transient incident queue to identify one of the plurality of incidents associated with the transient incident queue as the next highest priority incident;

transmitting the next highest priority incident associated with the transient incident queue for display via the user interface; and responsive to transmitting the next highest priority incident, discarding the transient incident queue stored in the one or more memory storage areas as a transient data construct.

2. The one or more computer-readable media of claim 1, wherein the incident resolution agent is a first incident resolution agent, and wherein the request is a first request, the operations further comprising:

receiving a release of the next highest priority incident from the first incident resolution agent;

receiving from a second incident resolution agent, a second request for the next highest priority incident; and transmitting the next highest priority incident to the second incident resolution agent.

3. The one or more computer-readable media of claim 1, wherein the transient incident queue is a first transient incident queue and the queue definition is a first queue definition, the operations further comprising:

generating a second transient incident queue based at least in part on a second queue definition.

4. The one or more computer-readable media of claim 3, the operations further comprising:

associating the incident with the second transient incident queue based at least in part on a second queue assignment rule of the one or more queue assignment rules; and processing the second transient incident queue to identify the next highest priority incident.

5. The one or more computer-readable media of claim 4, the operations further comprising:

receiving an indication of a status change associated with the incident; and reprocessing the first transient incident queue and the second transient incident queue in response to the indication of the status change.

6. The one or more computer-readable media of claim 1, wherein the incident is a first incident, the operations further comprising:

identifying a second incident requiring resolution; and associating the second incident with the transient incident queue based at least in part on the one or more queue assignment rules, wherein the plurality of incidents further includes the second incident.

7. A method for performing fully-automated operations, the fully-automated operations comprising:

receiving, by an incident handling system comprising one or more computers via one or more networks and on behalf of an automated teller machine (ATM), information associated with an incident requiring resolution, wherein the information associated with the incident requiring resolution is (a) indicative of at least one of a software fault of the ATM or a hardware fault of the ATM, and (b) stored in one or more memory storage areas as a non-transient data construct;

responsive to receiving the information associated with the incident requiring resolution, electronically assigning, by the incident handling system, a tag corresponding to a tag definition that enables referencing or aggregating a set of one or more incidents, wherein the set of one or more incidents comprises one or more fault codes, to the incident by:

(a) automatically determining whether the incident satisfies a tag rule corresponding to the tag definition, and (b) responsive to determining that the incident satisfies the tag rule corresponding to the tag definition, electronically assigning the tag to the incident;

receiving, by the incident handling system, a request for a next highest priority incident, the request received on behalf of an incident resolution agent as input via a user interface;

responsive to receiving the request for the next highest priority incident, dynamically generating, by the incident handling system, a transient incident queue for identifying the next highest priority incident, wherein the transient incident queue (a) corresponds to an incident queue definition enabling aggregation of incidents for resolution, and (b) is stored in the one or more memory storage areas as a transient data construct;

associating, by the incident handling system, a plurality of incidents with the transient incident queue, wherein (a) at least a subset of the plurality of incidents is assigned the tag, (b) the plurality of incidents comprises the incident, and (c) associating the plurality of incidents with the transient incident queue comprises:

(1) automatically determining whether the incident satisfies a queue assignment rule of one or more queue assignment rules corresponding to the incident queue definition, and (2) responsive to determining that the incident satisfies the queue assignment rule, electronically assigning the incident to the transient incident queue, wherein (i) the one or more queue assignment rules are stored in a queue assignment rules repository and are applied using one or more selected from the group consisting of Boolean operations, dynamic evaluations, and conditional logic, and (ii) the transient incident queue is identifiable based at least in part on the incident resolution agent;

processing, by the incident handling system, the transient incident queue to identify one of the plurality of incidents associated with the transient incident queue as the next highest priority incident;

transmitting, by the incident handling system, the next highest priority incident associated with the transient incident queue for display via the user interface; and after transmitting the next highest priority incident, discarding, by the incident handling system, the transient incident queue stored in the one or more memory storage areas as a transient data construct.

8. The method of claim 7, wherein the request is a first request received from a first incident resolution agent, and wherein the next highest priority incident is transmitted to the first incident resolution agent, the method further comprising:

receiving, by the incident handling system, a release of the next highest priority incident from the first incident resolution agent;

receiving, by the incident handling system, from a second incident resolution agent, a second request for the next highest priority incident; and transmitting, by the incident handling system, the next highest priority incident to the second incident resolution agent.

9. The method of claim 7, wherein the transient incident queue is a first transient incident queue and the one or more queue assignment rules comprise a first queue, the method further comprising:

generating, by the incident handling system, in response to receiving the request for the next highest priority incident, the transient incident queue based at least in part on a first queue definition;

generating, by the incident handling system, a second transient incident queue based at least in part on a second queue definition;

associating, by the incident handling system, the incident with the second transient incident queue based at least in part on a second queue assignment rule; and processing, by the incident handling system, the second transient incident queue to identify the next highest priority incident;

receiving, by the incident handling system, an indication of a status change associated with the incident; and reprocessing, by the incident handling system, the first transient incident queue and the second transient incident queue in response to the indication of the status change.

* * * * *